United States Patent
Sukhachev et al.

(10) Patent No.: US 11,356,532 B1
(45) Date of Patent: Jun. 7, 2022

(54) SYSTEMS AND METHODS FOR PACKAGING WEB RESOURCES

(71) Applicant: Meta Platforms, Inc., Menlo Park, CA (US)

(72) Inventors: Andrey Sukhachev, Sunnyvale, CA (US); Artur Galiullin, Jersey City, NJ (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/100,241

(22) Filed: Aug. 10, 2018

(51) Int. Cl.
| | | |
|---|---|---|
| *H04L 67/63* | (2022.01) | |
| *H04L 67/02* | (2022.01) | |
| *G06F 9/50* | (2006.01) | |
| *H04L 67/00* | (2022.01) | |
| *G06F 16/957* | (2019.01) | |

(52) U.S. Cl.
CPC .......... *H04L 67/327* (2013.01); *G06F 9/5027* (2013.01); *G06F 16/957* (2019.01); *H04L 67/02* (2013.01); *H04L 67/34* (2013.01)

(58) Field of Classification Search
CPC ....... H04L 67/327; H04L 67/02; H04L 67/34; G06F 16/957; G06F 9/5027
See application file for complete search history.

(56) References Cited

U.S. PATENT DOCUMENTS

| | | | | |
|---|---|---|---|---|
| 8,346,887 B1* | 1/2013 | Kembel | ................ | G06F 3/0484 709/217 |
| 8,843,471 B2* | 9/2014 | Weinman, Jr. | ........ | G06F 16/951 707/711 |
| 8,910,132 B2* | 12/2014 | Kolesnikov | ............... | G06F 8/65 717/140 |
| 8,996,661 B1* | 3/2015 | Kolam | .................... | H04L 67/06 709/219 |
| 9,378,178 B1* | 6/2016 | Baessler | ................ | G06F 15/167 |
| 9,558,060 B1* | 1/2017 | Cessac | ................ | G06F 3/04842 |
| 9,646,100 B2* | 5/2017 | Shyamsunder | ....... | G06F 16/957 |

(Continued)

OTHER PUBLICATIONS

"Packager," accessed at https://our.internmc.facebook.com/intern/wiki/Static_Resources/Packager/, accessed on Mar. 6, 2018, p. 2.

(Continued)

*Primary Examiner* — William G Trost, IV
*Assistant Examiner* — Monishwar Mohan
(74) *Attorney, Agent, or Firm* — FisherBroyles, LLP

(57) ABSTRACT

The disclosed computer-implemented method may include (i) identifying a set of resources stored on a server that are requested by a browser when the browser loads a web page, (ii) determining a first modification pattern with which a first resource within the set of resources is modified, (iii) determining a second modification pattern with which a second resource within the set of resources is modified, (iv) evaluating a compatibility between the first modification pattern and the second modification pattern, and (v) packaging, based at least in part on the compatibility between the first modification pattern and the second modification pattern, the first resource and the second resource into a package that is sent by the server to the browser via a single network protocol request. Various other methods, systems, and computer-readable media are also disclosed.

18 Claims, 6 Drawing Sheets

(56) References Cited

U.S. PATENT DOCUMENTS

| | | | |
|---|---|---|---|
| 9,696,896 B2* | 7/2017 | Dubey | G06F 3/0485 |
| 9,769,030 B1* | 9/2017 | Ramalingam | H04L 41/22 |
| 9,785,621 B2* | 10/2017 | Podjarny | G06F 40/134 |
| 9,817,646 B1* | 11/2017 | Chen | G06F 9/45529 |
| 10,289,658 B1* | 5/2019 | Chen | G06F 40/186 |
| 2009/0320047 A1* | 12/2009 | Khan | G06F 9/542 |
| | | | 719/318 |
| 2010/0281458 A1* | 11/2010 | Paladino | G06F 8/71 |
| | | | 717/106 |
| 2011/0202828 A1* | 8/2011 | Wan | G06F 16/9577 |
| | | | 715/234 |
| 2012/0185835 A1* | 7/2012 | Klots | G06F 16/957 |
| | | | 717/152 |
| 2013/0218868 A1* | 8/2013 | Pitts | G06F 9/44505 |
| | | | 707/722 |
| 2013/0227056 A1* | 8/2013 | Vecera | H04L 67/2842 |
| | | | 709/217 |
| 2014/0019249 A1* | 1/2014 | Nicholas | G06Q 30/0254 |
| | | | 705/14.58 |
| 2014/0089824 A1* | 3/2014 | George | G06F 9/4451 |
| | | | 715/762 |
| 2014/0143647 A1* | 5/2014 | Reshadi | H04L 67/2842 |
| | | | 715/234 |
| 2014/0215019 A1* | 7/2014 | Ahrens | G06F 16/9574 |
| | | | 709/219 |
| 2014/0278610 A1* | 9/2014 | Carnahan | G06Q 10/02 |
| | | | 705/5 |
| 2014/0317738 A1* | 10/2014 | Be'ery | H04L 63/14 |
| | | | 726/23 |
| 2015/0012653 A1* | 1/2015 | Wei | H04L 41/0816 |
| | | | 709/224 |
| 2015/0019677 A1* | 1/2015 | Chen | H04L 67/2842 |
| | | | 709/213 |
| 2015/0149989 A1* | 5/2015 | Lu | G06F 8/65 |
| | | | 717/170 |
| 2015/0180875 A1* | 6/2015 | Kay | H04L 63/123 |
| | | | 726/4 |
| 2015/0205766 A1* | 7/2015 | Marcano | G06F 16/951 |
| | | | 715/235 |
| 2015/0206441 A1* | 7/2015 | Brown | G09B 5/00 |
| | | | 434/308 |
| 2015/0213118 A1* | 7/2015 | Sun | G06F 16/951 |
| | | | 707/736 |
| 2016/0094610 A1* | 3/2016 | Himmelreich | H04L 67/02 |
| | | | 709/217 |
| 2016/0142413 A1* | 5/2016 | Diep | G06F 21/51 |
| | | | 726/4 |
| 2016/0147518 A1* | 5/2016 | Dimitrakos | G06F 8/60 |
| | | | 717/120 |
| 2016/0285987 A1* | 9/2016 | Huang | H04L 67/02 |
| 2016/0313989 A1* | 10/2016 | Chen | G06F 8/654 |
| 2016/0357715 A1* | 12/2016 | Li | G06F 16/95 |
| 2016/0360011 A1* | 12/2016 | Mihara | G06F 9/44536 |
| 2018/0060132 A1* | 3/2018 | Maru | G06F 16/24553 |
| 2018/0060294 A1* | 3/2018 | Fauchere | G06F 40/14 |
| 2018/0121211 A1* | 5/2018 | Bohdan | G06F 9/4411 |
| 2018/0139180 A1* | 5/2018 | Napchi | G06F 21/554 |
| 2018/0293509 A1* | 10/2018 | Sharma | G06F 16/735 |

OTHER PUBLICATIONS

"Optimal Package Strategy," accessed at https://our.internmc.facebook.com/intern/wiki/OptimalPackageStrategy, accessed on Mar. 6, 2018, p. 3.

* cited by examiner

SYSTEMS AND METHODS FOR PACKAGING WEB RESOURCES

BACKGROUND

Loading speed is an important metric for web pages. Pages that load too slowly may frustrate users and often cause users to abandon the website entirely. One of the many strategies for ensuring that web pages load quickly is to bundle together multiple resources for the web page in a package that is loaded with a single hypertext transfer protocol (HTTP) request. Packaging resources may not only increase the speed with which web pages load but may also reduce the strain on networks by reducing the quantity of HTTP requests needed to load the web page. Many browsers may cache the resource package on the client device, further improving loading time for pages that load the same package. However, if any resource within the package is modified, the entire package may become invalid, reducing many of the efficiency gains. Accordingly, the instant disclosure identifies and addresses a need for additional and improved systems and methods for packaging web resources.

SUMMARY

As will be described in greater detail below, the instant disclosure describes systems and methods for packaging web resources according to how often the resources are modified.

In one example, a computer-implemented method for packaging web resources may include (i) identifying a set of resources stored on a server that are requested by a browser when the browser loads a web page, (ii) determining a first modification pattern with which a first resource within the set of resources is modified, (iii) determining a second modification pattern with which a second resource within the set of resources is modified, (iv) evaluating a compatibility between the first modification pattern and the second modification pattern, and (v) packaging, based at least in part on the compatibility between the first modification pattern and the second modification pattern, the first resource and the second resource into a package that is sent by the server to the browser via a single network protocol request.

In some examples, evaluating the compatibility between the first modification pattern and the second modification pattern may include determining a similarity between a frequency of modification of the first modification pattern and a frequency of modification of the second modification pattern. In some examples, evaluating the compatibility between the first modification pattern and the second modification pattern may include determining that a modification of the second resource is correlated with a modification of the first resource.

In one embodiment, the web page may include a home page of a website and packaging, based at least in part on the compatibility between the first modification pattern and the second modification pattern, the first resource and the second resource into the package may include packaging the first resource and the second resource into the package based at least in part on the first resource and the second resource being referenced by the home page of the website. In some examples, the computer-implemented method may further include excluding at least one additional resource from the package based at least in part on the additional resource not being referenced by the home page of the website. Additionally or alternatively, packaging the first resource and the second resource into the package based at least in part on the first resource and the second resource being referenced by the home page of the website may include selecting a packaging arrangement where the package includes the first resource and the second resource rather than an alternative packaging arrangement based at least in part on the packaging arrangement loading resources more efficiently for the home page of the website than the alternative packaging arrangement.

In one embodiment, packaging, based at least in part on the compatibility between the first modification pattern and the second modification pattern, the first resource and the second resource into the package may include determining that the first resource and the second resource are both referenced together by at least one additional web page. In one example, the computer-implemented method may further include detecting a modification of the first resource and repackaging the modified first resource and the second resource into a new package in response to detecting the modification of the first resource.

In one embodiment, the computer-implemented method may further include (i) identifying a third resource within the set of resources, (ii) determining a third modification pattern with which the third resource within the set of resources is modified, (iii) evaluating an additional compatibility between the third modification pattern and at least one of the first modification pattern or the second modification pattern, and (iv) packaging, based at least in part on the additional compatibility, the third resource, the first resource, and the second resource into a new package that is sent by the server to the browser via a single network protocol request. Additionally or alternatively, the computer-implemented method may further include identifying a subset of resources within the set of resources such that each resource within the subset of resources has a compatible modification pattern with each other resource within the subset of resources and packaging the subset of resources into an additional package in response to determining that each resource in the subset of resources has the compatible modification pattern.

In some examples, determining the first modification pattern may include monitoring the first resource for modification events during a predetermined window of time. In one embodiment, the computer-implemented method may further include (i) determining that the first modification pattern of the first resource has changed to a new modification pattern, (ii) evaluating a new compatibility between the new modification pattern and the second modification pattern, and (iii) packaging the first resource into a first package and the second resource into a second package rather than into a same package based at least in part on the new compatibility.

In one embodiment, a system for implementing the above-described method may include (i) an identification module, stored in memory, that identifies a set of resources stored on a server that are requested by a browser when the browser loads a web page, (ii) a determination module, stored in memory, that determines a first modification pattern with which a first resource within the set of resources is modified and determines a second modification pattern with which a second resource within the set of resources is modified, (iii) an evaluation module, stored in memory, that evaluates a compatibility between the first modification pattern and the second modification pattern, (iv) a packaging module, stored in memory, that packages, based at least in part on the compatibility between the first modification pattern and the second modification pattern, the first resource and the second resource into a package that is sent by the server to the browser via a single network protocol request, and (v) at least one physical processor configured to execute the identification module, the determination module, the evaluation module, and the packaging module.

In some examples, the above-described method may be encoded as computer-readable instructions on a computer-readable medium. For example, a computer-readable medium may include one or more computer-executable instructions that, when executed by at least one processor of a computing device, may cause the computing device to (i) identify a set of resources stored on a server that are requested by a browser when the browser loads a web page, (ii) determine a first modification pattern with which a first resource within the set of resources is modified, (iii) determine a second modification pattern with which a second resource within the set of resources is modified, (iv) evaluate a compatibility between the first modification pattern and the second modification pattern, and (v) package, based at least in part on the compatibility between the first modification pattern and the second modification pattern, the first resource and the second resource into a package that is sent by the server to the browser via a single network protocol request.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
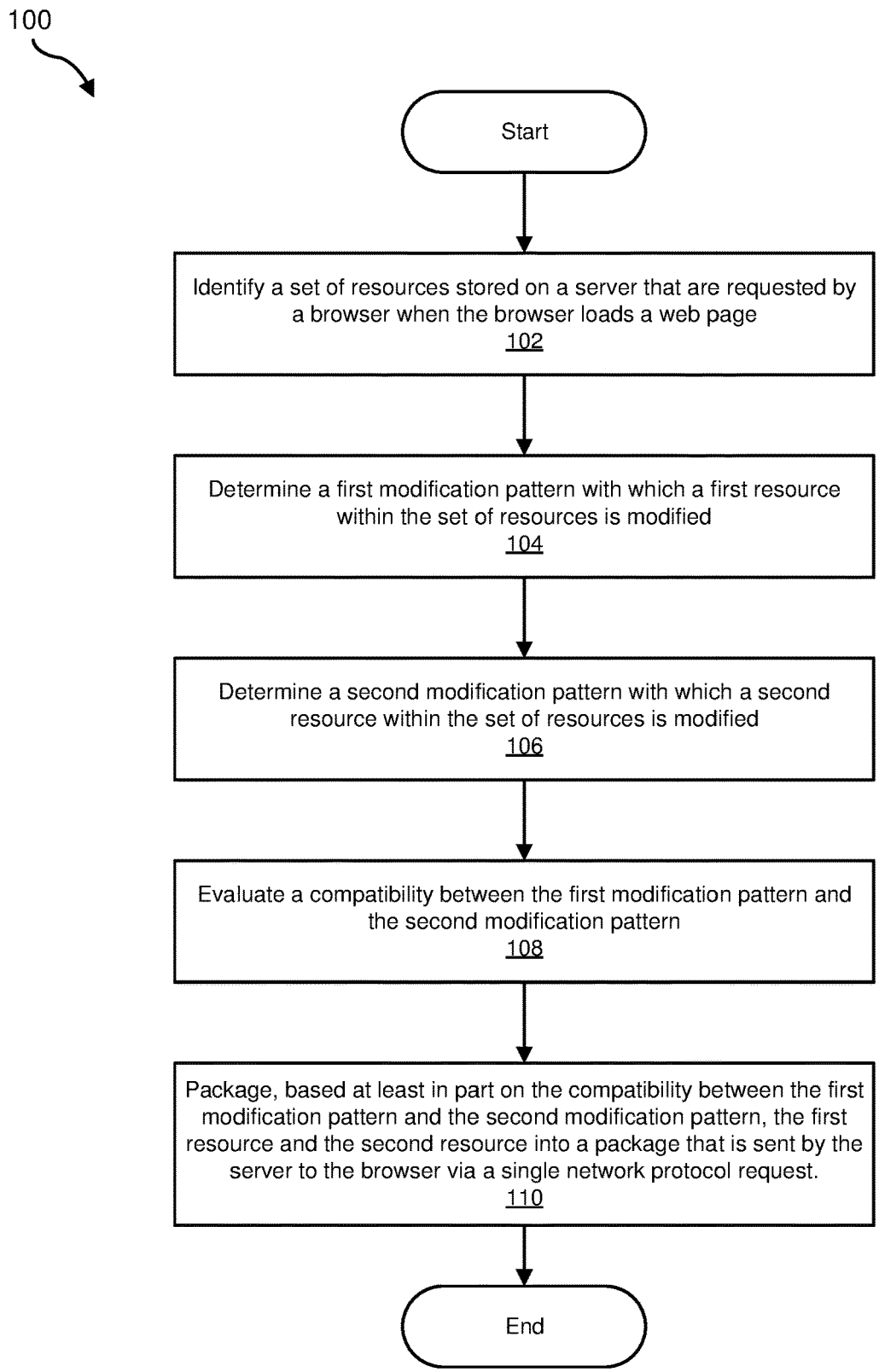
FIG. 1 is a flow diagram of an exemplary method for packaging web resources.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for packaging web resources. As will be explained in greater detail below, by packaging web resources based at least in part on compatible modification patterns, the systems described herein may reduce downloading of redundant resources caused when a single updated resource causes cache invalidation for the entire package containing the resource. By separating out frequently updated resources from infrequently updated and/or packaging together resources that are often modified together, the systems described herein may improve the speed with which web pages are loaded and/or reduce the burden on network bandwidth imposed by downloading web resources. In some embodiments, the systems and methods described herein may improve the functioning of a computing device by enabling the computing device to load web pages more quickly and/or cache web resources more efficiently. Additionally, the systems and methods described herein may improve the field of web resource distribution by packaging web resources more efficiently.

The following will provide, with reference to FIG. 1, detailed descriptions of an exemplary method for packaging web resources. Detailed descriptions of an exemplary modification schedule for web resources will be supplied in connection with FIG. 2. Detailed descriptions of exemplary packaging schemes for web resources and exemplary packages will be provided in connection with FIGS. 3 and 5, respectively. Additionally, detailed descriptions of exemplary systems for packaging web resources will be provided in connection with FIGS. 4 and 6.

FIG. 1 is a flow diagram of an exemplary computer-implemented method 100 for packaging web resources. The steps shown in FIG. 1 may be performed by any suitable computer-executable code and/or computing system, including the system(s) illustrated in FIG. 6. In one example, each of the steps shown in FIG. 1 may represent an algorithm whose structure includes and/or is represented by multiple sub-steps, examples of which will be provided in greater detail below.

As illustrated in FIG. 1, at step 102 one or more of the systems described herein may identify a set of resources stored on a server that are requested by a browser when the browser loads a web page.

In some examples, "resource," or "web resource," as used herein, may refer to any file and/or collection of files that are requested by a browser during the course of loading a web page. Examples of resources may include, without limitation, script files such as JavaScript files and/or style files such as cascading style sheet files. In some embodiments, resources may include image files, audio files, and/or video files. In some embodiments, a resource may be a static resource. In some examples, a resource may reference and/or load additional resources. In some embodiments, when a browser requests a web page, the web server may deliver page markup and a bootloader module with one or more resource maps and may also build and deliver pagelets. In one embodiment, the browser may then use the bootloader module to fetch the necessary packages. In some examples, the bootloader module may fetch packages in parallel if the web page specifies more than one package. In some examples, packaging resources into a greater number of packages may result in faster loading due to the bootloader module fetching packages in parallel. However, packaging resources into a greater number of packages may also result in the browser sending a greater number of HTTP requests to load a single web page. In some examples, determining an efficient packaging technique for the resources referenced by a web page or set of web pages may involve making a trade-off between number of packages versus size of packages and/or other packaging constraints.

In some examples, the term "browser," as used herein, may refer to any application that loads and displays web pages. In some examples, a browser may include an application on a desktop computing device. In other examples, a browser may include a mobile browser application.

In some examples, the term "web page," as used herein, may refer to document accessible via the Internet. In some embodiments, a web page may be a hypertext markup language (HTML) document and/or may be loaded via a HTTP or HTTP secure (HTTPS) request. In some examples, a web page may include references to resources such as scripts and/or graphics. In some examples, multiple web pages may be linked together to form a website.

The systems described herein may identify the set of web resources in a variety of ways. In some embodiments, the systems described herein may identify web resources loaded by a single web page for a website. Additionally or alternatively, the systems described herein may identify web resources loaded by multiple pages of a website.

At step 104, one or more of the systems described herein may determine a first modification pattern with which a first resource within the set of resources is modified.

In some examples, the term "modification pattern," as used herein, may refer to any description of the schedule, frequency, and/or conditions under which a resource is modified. In some examples, a resource may change periodically. For example, a modification pattern may include the information that a particular resource is modified every Monday. In another example, a modification pattern may include the information indicating that a particular resource is modified whenever either of two additional resources are modified. Additionally or alternatively, a modification pattern may include the information that a resource is modified every other day. In other examples, a resource may be modified on a schedule that is not periodic. For example, a resource may be modified about once a week, but not on a specific day of the week. In another example, a resource may typically be modified every few months, but not on a specific day of the month. In some examples, a modification pattern may include the information indicating that a resource is modified unpredictably. For example, a resource may be manually modified by developers whenever a bug is found and may not follow any set modification schedule.

The systems described herein may determine the modification pattern of the first resource in a variety of ways and/or contexts. In some examples, the systems described herein may determine the first modification pattern by monitoring the first resource for modification events during a predetermined window of time. For example, the systems described herein may monitor the first resource for modification events over the span of a day, a week, and/or a month. In some embodiments, the systems described herein may continue monitoring the first resource and/or may resume monitoring the first resource at a later time in order to detect changes in the modification pattern.

At step 106, one or more of the systems described herein may determine a second modification pattern with which a second resource within the set of resources is modified. In some examples, the systems described herein may determine the second modification pattern in similar ways and/or contexts to how the systems described herein determine the first modification pattern. In other examples, the systems described herein may determine the second modification pattern in a different way than the systems described herein determined the first modification pattern. For example, the systems described herein may determine the first modification pattern by determining a schedule of modifications for the first resource and the second modification pattern by determining that modifications of the second resource are correlated with modifications of the first resource.

At step 108, one or more of the systems described herein may evaluate a compatibility between the first modification pattern and the second modification pattern.

The systems described herein may evaluate the compatibility between modification patterns in a variety of ways. In some examples, the systems described herein may evaluate the compatibility between the first modification pattern and the second modification pattern by determining the similarity between the frequency of modification of the first modification pattern and the frequency of modification of the second modification pattern. For example, the systems described herein may determine that the two patterns are compatible because both patterns describe daily modifications. In another example, the systems described herein may determine that the two patterns are not compatible because one pattern describes weekly modifications and the other describes daily modifications. In some examples, the systems described herein may determine that the two patterns are compatible because the patterns describe modifications that occur at similar but not identical times. For example, if the first pattern describes modifications that occur every Monday and the second pattern describes modifications that occur every Tuesday, the systems described herein may determine that the modification patterns are compatible because, once the cache is updated following the beginning of the week modifications, the cached version of the package in the cache will stay up-to-date for the rest of the week and therefore it is likely that the second of any two consecutive requests from a client will not require a redownload of the package. By contract, the systems described herein may determine that the first modification pattern is not compatible with a third modification pattern that describes modifications every Thursday because the probability that the cache will be out-of-date for the second of any two consecutive requests from a client is greater.

In some examples, the systems described herein may determine that two patterns with a similar frequency are not compatible. For example, one pattern may include modifications on even-numbered calendar days while the other pattern may include modifications on odd-numbered calendar days. Despite both patterns including a frequency of every-other-day modifications, in some embodiments, the systems described herein may determine that the two patterns are not compatible because the resources are modified at different times. In other embodiments, the systems described herein may determine that the two patterns are compatible despite describing resource modifications that occur on different days because the two patterns both describe frequent updates, as opposed to a non-compatible pattern that describes more rarely occurring updates such as once a week or once a month.

In some examples, the systems described herein may determine the compatibility between the first modification pattern and the second modification pattern by determining that the modification of the second resource is correlated with the modification of the first resource. In some examples, two or more resources may update at the same time or at near the same time more than a certain percentage of time. For example, when the first resource is updated, the second resource may be updated in response. In some examples, the second resource may call and/or otherwise rely on the first resource and changes in the first resource may necessitate changes in the second resource, causing the second resource to be updated immediately when the first resource is updated. In some examples, not all changes in the first resource may necessitate a change in the second resource but the resources may be updated together a sufficient percentage of the time to have a compatible modification pattern. In another example, both resources may update in response to changes to a third resource.

In some embodiments, the systems described herein may determine that the modification of a first resource is correlated with the modification of a second resource by monitoring modifications of the resources and observing that the first resource and the second resource are always or often modified within a predetermined time range of one another. For example, the second resource may always or often be modified within five minutes of the first resource being modified. In another example, both resources may be modified simultaneously. Additionally or alternatively, the systems and methods described herein may examine the resources and determine that the second resource references the first resource.

At step 110, one or more of the systems described herein may package, based at least in part on the compatibility between the first modification pattern and the second modification pattern, the first resource and the second resource into a package that is sent by the server to the browser via a single network protocol request.

In some examples, the term "package," as used herein, may refer to any collection of one or more files that are combined in such a way that the files can be sent in a single network protocol request. In some embodiments, the systems described herein may compress files when combining the files into a package. In other embodiments, the systems described herein may not compress files and/or packages. In some embodiments, a package may be sent via a single HTTP request. In one embodiment, several packages may be sent concurrently via network protocol requests.

Figure 2:
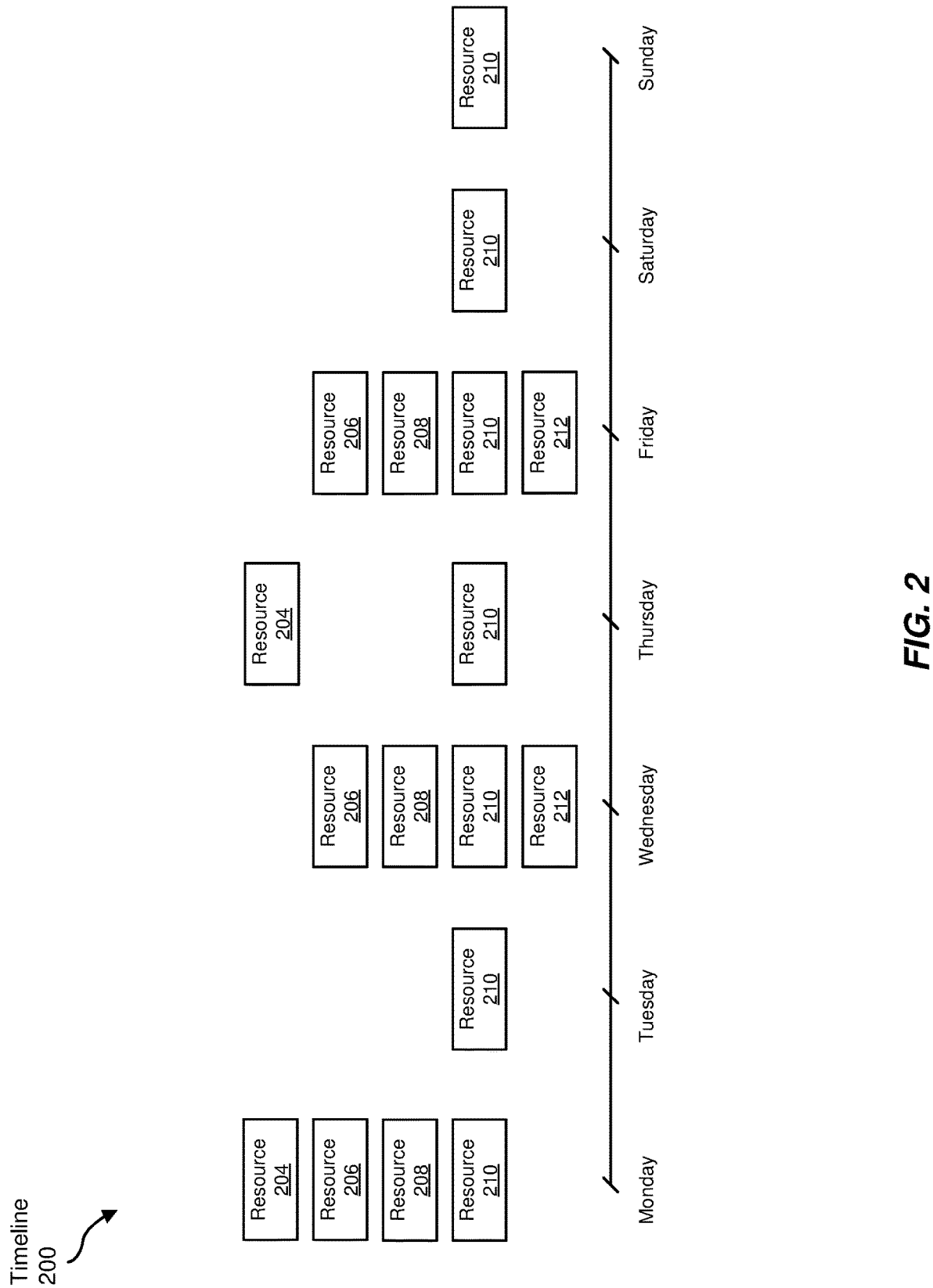
FIG. 2 is a block diagram of an exemplary modification schedule for web resources.

In some examples, different resources may be modified in different patterns and the systems described herein may evaluate the compatibility of the modification patterns based on a variety of factors. For example, as illustrated in FIG. 2, a set of resources may be updated on a recurring weekly schedule, such as the schedule shown on timeline 200. In other examples, resources may be updated on a recurring hourly, daily, monthly, or other suitable schedule. In one example, a resource 204 may update on Monday and Thursday, resources 206 and 208 may update on Monday, Wednesday, and Friday, a resource 210 may update every day, and a resource 212 may update on Wednesday and Friday.

In some examples, the systems described herein may package resources 206 and 208 together because resources 206 and 208 update on the same days. In one embodiment, the systems described herein may also package resource 212 with resources 206 and 208 because resource 212 updates only on days when resources 206 and 208 update. In other embodiments, the systems described herein may not package resource 212 with resources 206 and 208 because resources 206 and 208 update on a day when resource 212 does not update. Similarly, even though resource 210 updates on every day that resources 206 and 208 update, the systems described herein may not package resource 210 with resources 206 and 208 because resource 210 also updates on several days when resources 206 and 208 do not update.

Figure 3:
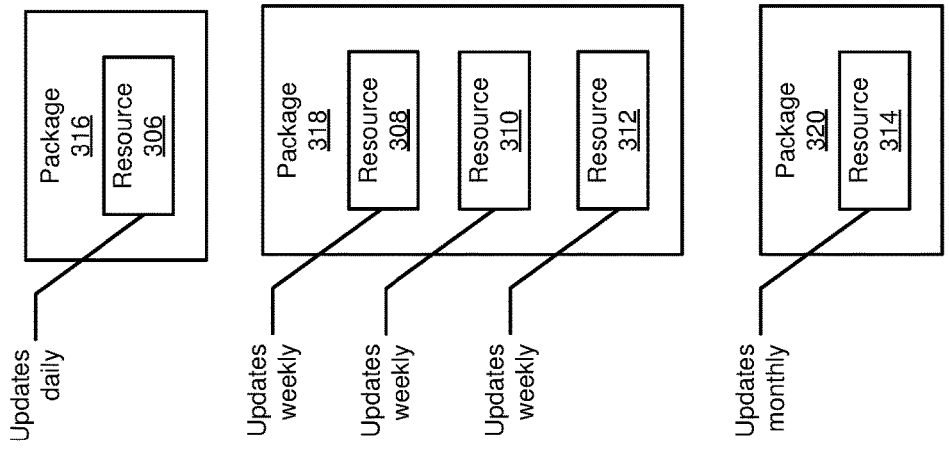
FIG. 3 is a block diagram of exemplary packaging schemes for web resources.
Figure 3:
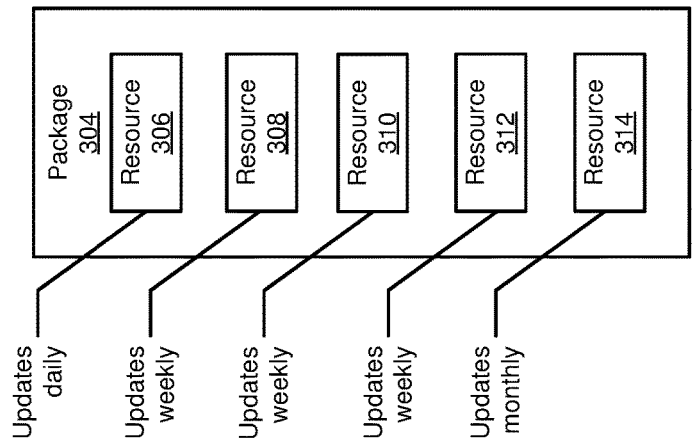

In some embodiments, the systems described herein may create a different packaging scheme than other systems that do not account for modification patterns when creating packages. For example, as illustrated in FIG. 3, a naïve packaging scheme 302(a) may not account for modification patterns while a packaging scheme 302(b) may account for modification patterns. In one example, in packaging scheme 302(a), a package 304 may include a resource 306 that is updating daily, resources 308, 310, and/or 312 that are updated weekly, and/or a resource 314 that is updated monthly. In this example, in order to stay current, package 304 may need to be repackaged on a daily basis when resource 306 is updated, even though the remaining resources in the package may not have been updated that day. By contrast, in packaging scheme 302(b), resource 306 may be packaged in a package 316, resources 308, 310, and/or 312 may be packaged in a package 318, and/or resource 314 may be packaged in a package 320. In packaging scheme 302(b), the systems described herein may update package 316 on a daily basis but may only update package 318 on a weekly basis because the resources in package 318 only change once per week. By separating out resources into different packages based on modification patterns, the systems described herein may reduce the total amount of repackaging required to maintain current packages.

Figure 4:
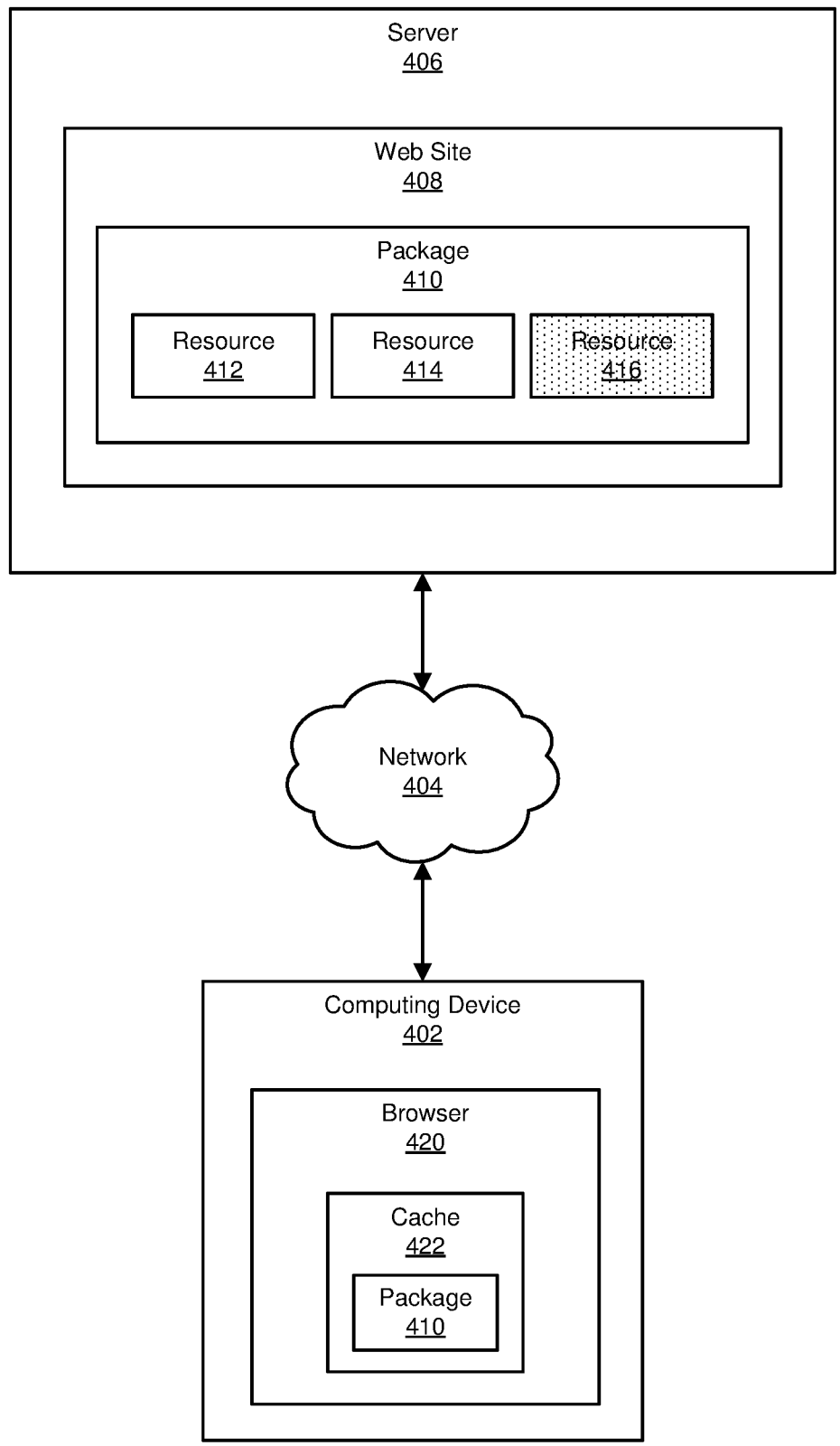
FIG. 4 is a block diagram of an exemplary system for packaging web resources.

In some embodiments, a browser may cache one or more packages on a client device. For example, as illustrated in FIG. 4, a server 406 may communicate with a computing device 402 via a network 404. In some embodiments, server 406 may represent a web server and/or several networked web servers (e.g., the cloud). In some embodiments, computing device 402 may represent a client computing device such as a laptop, desktop, and/or mobile device. In one example, server 406 may host a website 408 that includes resources 412, 414, and/or 416 in a package 410. In some examples, a browser 420 on computing device 402 may request one or more pages of website 408 that use the resources packaged in package 410. In one example, browser 420 may store package 410 in a cache 422. By storing package 410 in cache 422, browser 420 may load the resources in cache 422 without making network requests of server 406, increasing the speed with which the resources load. However, if any resource in package 410 is modified, package 410 will be invalidated and need to be re-downloaded because the version of package 410 in cache 422 will be out of date. For example, if resource 416 is modified, the cached version of package 410 will be invalidated. If browser 420 loads a web page that includes the resources in package 410 again, browser 420 may have to redownload the entirety of package 410, including resources 412 and 414, even though only resource 416 has changed and resources 412 and 414 have not. Because the modification of one resource in a package invalidates cached versions of the entire package, packaging resources according to modification pattern may save a considerable amount of resources by avoiding redundant re-downloading of unchanged resources when one resource is modified.

Figure 5:
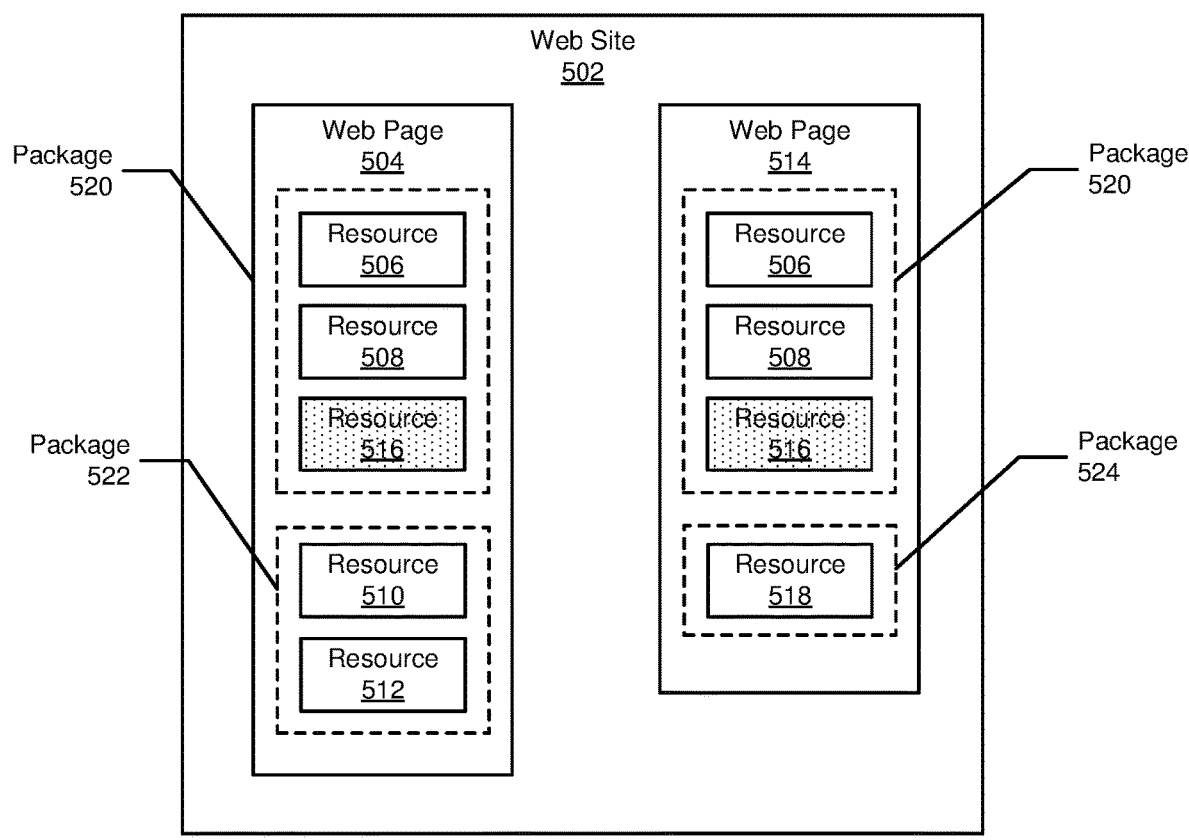
FIG. 5 is a block diagram of exemplary packages.

In some embodiments, the systems described herein may package resources based at least in part on what web pages load the resources in addition to packaging resource based on compatible modification patterns. For example, the systems described herein may package resources together based at least in part on the resources being referenced by the same web page. In another example, the systems described herein may package resources together that are loaded by different pages that are correlated with one another (e.g., a user who visits one page is likely to visit the other soon thereafter). In one embodiment, the systems described herein may package the first resource and the second resource into the package based at least in part on determining that the first resource and the second resource are both referenced together by at least one additional web page. For example, as illustrated in FIG. 5, a website 502 may include two web pages, web page 504 and web page 514. In one example, web page 504 may load resources 506, 508, 516, 510, and/or 512 while web page 514 may load resources 506, 508, 516, and/or 518. In some examples, because both web pages load resources 506, 508, and/or 516, the systems described herein may package resources 506, 508, and/or 516 into a package 520. In one example, the systems described herein may package resources 510 and 512 into a package 522 and/or resource 518 into a package 524. Thus, when a browser requests web page 504, the browser may request packages 520 and/or 522. If the browser next requests web page 514, the browser may have already cached package 520 and may only request package 524. In some examples, the systems described herein may split up the resources into different packages based on modification pattern. For example, resource 516 may not have a compatible modification pattern with resources 506 and/or 508. In this example, the systems described herein may package resources 506 and 508 into one package and resource 516 into a separate package, even though all three resources are loaded by both page 504 and web page 514.

In some embodiments, the systems described herein may give priority to significant web pages on a website, such as the home page. For example, the systems described herein may package the first resource and the second resource into the package based at least in part on the first resource and the second resource being referenced by the home page of the website. In some embodiments, the systems described herein may select a packaging arrangement where the package includes the first resource and the second resource rather than an alternative packaging arrangement based at least in part on the packaging arrangement loading resources more efficiently for the home page of the website than the alternative packaging arrangement. In some examples, systems described herein may exclude at least one additional resource from the package based at least in part on the additional resource not being referenced by the home page of the website.

For example, the home page of the website may request a set of three resources while other pages may request a set of four resources that includes those three resources. In this example, the systems described herein may package the three resources together without the fourth, enabling the home page of the website to load more efficiently. In this example, if the systems described herein were using a packaging scheme that weighted all pages equally, the systems described herein may package all four resources together to enable the other pages to load all four resources with a single request.

In some examples, the systems described herein may package multiple resources together based on compatible modification patterns. For example, systems described herein may identify a third resource within the set of resources, determine a third modification pattern with which the third resource is modified, evaluate the compatibility between the third modification pattern and the first modification pattern and/or the second modification pattern, and package the third resource, the first resource, and the second resource into a new package that is sent by the server to the browser via a single network protocol request. In some examples, the systems described herein may package compatible subsets of resources together. For example, the systems described herein may identify a subset of resources within the set of resources such that each resource within the subset of resources has a compatible modification pattern with each other resource within the subset of resources and may package the subset of resources into a package in response to determining that each resource in the subset of resources has a compatible modification pattern.

Figure 6:
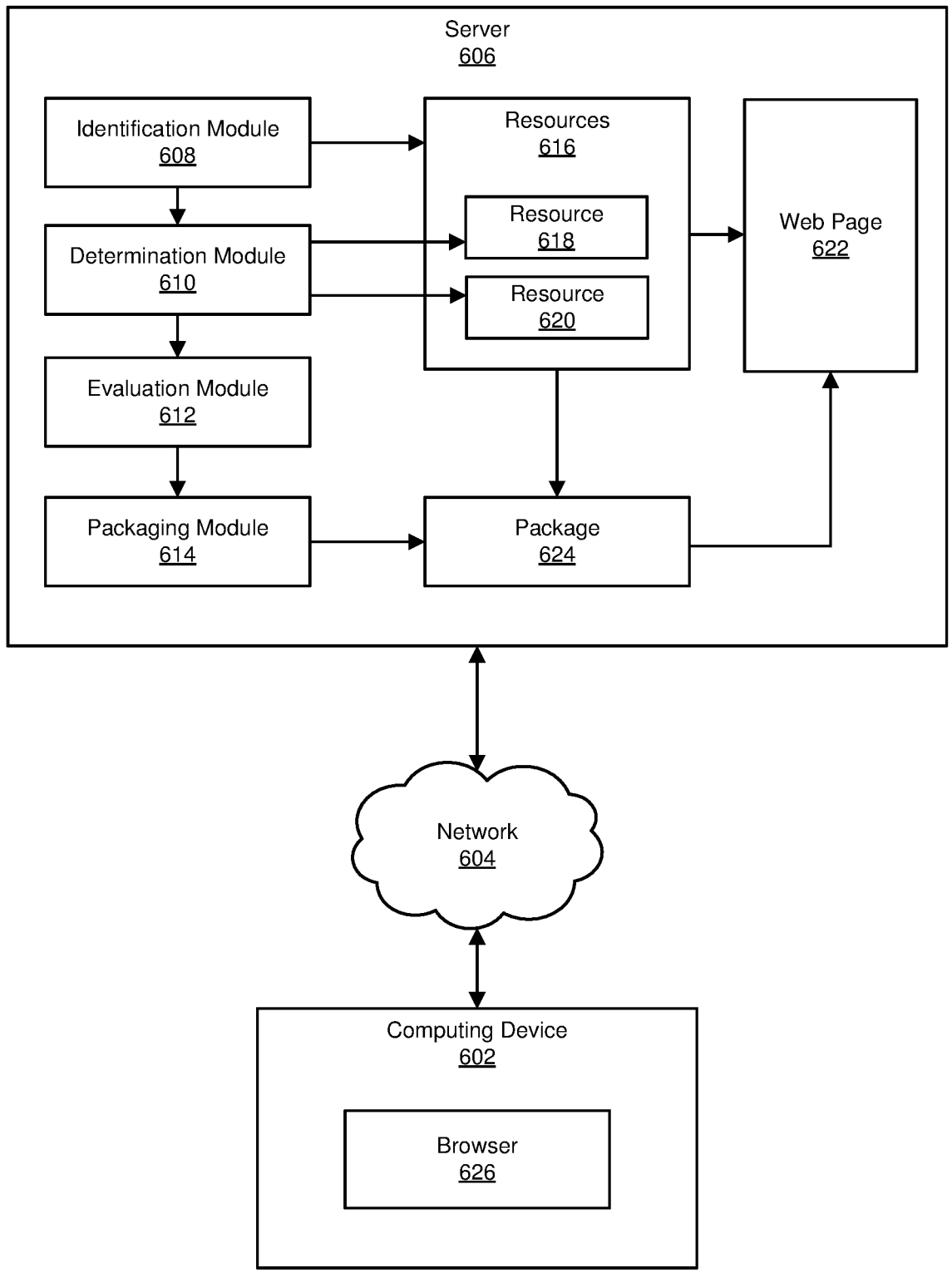
FIG. 6 is a block diagram of an exemplary system for packaging web resources.

In some embodiments, the systems described herein may be implemented on a server, such as a web server, that serves content to one or more client devices, such as server 606 serving content to computing device 602 in FIG. 6. Although illustrated as a single element, in some embodiments, server 606 may represent multiple physical and/or virtual servers. In some embodiments, computing device 602 may represent any client device capable of displaying a web page. Examples of computing device 602 may include, without limitation, laptops, desktops, mobile devices, smartphones, and/or wearable devices. For example, as illustrated in FIG. 6, an identification module 608 may identify a set of resources 616 stored on a server 606 that are requested by a browser 626 when browser 626 loads a web page 622. Determination module 610 may determine a first modification pattern with which a first resource within set of resources 616 is modified. In some examples, a determination module 610 may determine a first modification pattern with which a resource 618 within set of resources 616 is modified and/or a second modification pattern with which a resource 620 within set of resources 616 is modified. At some later time, an evaluation module 612 may evaluate a compatibility between the first modification pattern and the second modification pattern. Next, packaging module 614 may package, based at least in part on the compatibility between the first modification pattern and the second modification pattern, resource 618 and resource 620 into a package 624 that is sent by server 606 to browser 626 via a single network protocol request.

As discussed in connection with method 100 above, the systems and methods described herein may package web resources based at least in part on how frequently and/or under what conditions the web resources are modified. By separating out web resources that are typically modified at different times into different packages, the systems and methods described herein may improve the efficiency with which web pages are loaded and/or cached. Additionally or alternatively, the systems and methods described herein may prioritize a web page, such as the home page of a website, when choosing a packaging scheme, increasing the efficiency with which the chosen web page is loaded and improving the experience of visitors to the website.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive web resource data to be transformed, transform the web resource data by packaging the web resource data, output a result of the transformation to upload the package web resource data to a server, use the result of the transformation to provide resources to a web page, and store the result of the transformation to a cache to provide web resources more efficiently. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   identifying a set of resources stored on a server that are requested by a browser when the browser loads a web page;
   monitoring the set of resources for modification events;
   determining a first modification schedule with which a first resource within the set of resources is modified, the first modification schedule being determined based on an analysis of times at which the first resource is modified as detected while monitoring the set of resources for modification events;
   determining a second modification schedule with which a second resource within the set of resources is modified, the second modification schedule being determined based on an analysis of times at which the second resource is modified as detected while monitoring the set of resources for modification events;
   evaluating a compatibility between the first modification schedule and the second modification schedule based at least in part on determining that a timing of a modification of the second resource is correlated with a timing of a modification of the first resource; and
   packaging, based at least in part on the compatibility between the first modification schedule and the second modification schedule, the first resource and the second resource into a package that is sent by the server to the browser via a single network protocol request.

2. The computer-implemented method of claim 1, wherein evaluating the compatibility between the first modification schedule and the second modification schedule comprises determining a similarity between a frequency of modification of the first modification schedule and a frequency of modification of the second modification schedule.

3. The computer-implemented method of claim 1, wherein the web page comprises a home page of a website; and
   packaging, based at least in part on the compatibility between the first modification schedule and the second modification schedule, the first resource and the second resource into the package comprises packaging the first resource and the second resource into the package based at least in part on the first resource and the second resource being referenced by the home page of the website.

4. The computer-implemented method of claim 3, further comprising excluding at least one additional resource from the package based at least in part on the additional resource not being referenced by the home page of the website.

5. The computer-implemented method of claim 3, wherein packaging the first resource and the second resource into the package based at least in part on the first resource and the second resource being referenced by the home page of the website comprises selecting a packaging arrangement where the package includes the first resource and the second resource rather than an alternative packaging arrangement based at least in part on the packaging arrangement loading resources more efficiently for the home page of the website than the alternative packaging arrangement.

6. The computer-implemented method of claim 1, wherein monitoring the set of resources for modification events comprises monitoring the set of resources during a predetermined window of time.

7. The computer-implemented method of claim 1, wherein packaging, based at least in part on the compatibility between the first modification schedule and the second modification schedule, the first resource and the second resource into the package comprises determining that the first resource and the second resource are both referenced together by at least one additional web page.

8. The computer-implemented method of claim 1, further comprising:
  detecting a modification of the first resource; and
  repackaging the modified first resource and the second resource into a new package in response to detecting the modification of the first resource.

9. The computer-implemented method of claim 1, further comprising:
  identifying a third resource within the set of resources;
  determining a third modification schedule with which the third resource within the set of resources is modified, the third modification schedule describing conditions under which the third resource is modified;
  evaluating an additional compatibility between the third modification schedule and at least one of the first modification schedule or the second modification schedule; and
  packaging, based at least in part on the additional compatibility, the third resource, the first resource, and the second resource into a new package that is sent by the server to the browser via a single network protocol request.

10. The computer-implemented method of claim 1, further comprising:
  identifying a subset of resources within the set of resources such that each resource within the subset of resources has a compatible modification schedule with each other resource within the subset of resources; and
  packaging the subset of resources into an additional package in response to determining that each resource in the subset of resources has the compatible modification schedule.

11. The computer-implemented method of claim 1, further comprising:
  determining that the first modification schedule of the first resource has changed to a new modification schedule;
  evaluating a new compatibility between the new modification schedule and the second modification schedule; and
  packaging the first resource into a first package and the second resource into a second package rather than into a same package based at least in part on the new compatibility.

12. A system comprising:
  an identification module, stored in memory, that identifies a set of resources stored on a server that are requested by a browser when the browser loads a web page;
  a determination module, stored in memory, that:
    monitors the set of resources for modification events;
    determines a first modification schedule with which a first resource within the set of resources is modified, the first modification schedule being determined based on an analysis of times at which the first resource is modified as detected while monitoring the set of resources for modification events; and
    determines a second modification schedule with which a second resource within the set of resources is modified, the second modification schedule being determined based on an analysis of times at which the second resource is modified as detected while monitoring the set of resources for modification events;
  an evaluation module, stored in memory, that evaluates a compatibility between the first modification schedule and the second modification schedule based at least in part on determining that a timing of a modification of the second resource is correlated with a timing of a modification of the first resource;
  a packaging module, stored in memory, that packages, based at least in part on the compatibility between the first modification schedule and the second modification schedule, the first resource and the second resource into a package that is sent by the server to the browser via a single network protocol request; and
  at least one physical processor configured to execute the identification module, the determination module, the evaluation module, and the packaging module.

13. The system of claim 12, wherein the evaluation module evaluates the compatibility between the first modification schedule and the second modification schedule by determining a similarity between a frequency of modification of the first modification schedule and a frequency of modification of the second modification schedule.

14. The system of claim 12, wherein the web page comprises a home page of a website; and
  packaging, based at least in part on the compatibility between the first modification schedule and the second modification schedule, the first resource and the second resource into the package comprises packaging the first resource and the second resource into the package based at least in part on the first resource and the second resource being referenced by the home page of the website.

15. The system of claim 14, wherein the packaging module excludes at least one additional resource from the package based at least in part on the additional resource not being referenced by the home page of the website.

16. The system of claim 14, wherein the packaging module packages the first resource and the second resource into the package based at least in part on the first resource and the second resource being referenced by the home page of the website by selecting a packaging arrangement where the package includes the first resource and the second resource rather than an alternative packaging arrangement based at least in part on the packaging arrangement loading resources more efficiently for the home page of the website than the alternative packaging arrangement.

17. The system of claim 12, monitoring the set of resources for modification events comprises monitoring the set of resources during a predetermined window of time.

18. A non-transitory computer-readable medium comprising:
   computer-readable instructions that, when executed by at least one processor of a computing device, cause the computing device to:
   identify a set of resources stored on a server that are requested by a browser when the browser loads a web page;
   monitor the set of resources for modification events;
   determine a first modification schedule with which a first resource within the set of resources is modified, the first modification schedule being determined based on an analysis of times at which the first resource is modified;
   determine a second modification pattern with which a second resource within the set of resources is modified, the second modification schedule being determined based on an analysis of times at which the second resource is modified;
   evaluate a compatibility between the first modification schedule and the second modification schedule based at least in part on determining that a timing of a modification of the second resource is correlated with a timing of a modification of the first resource; and
   package, based at least in part on the compatibility between the first modification schedule and the second modification schedule, the first resource and the second resource into a package that is sent by the server to the browser via a single network protocol request.

* * * * *